UNITED STATES PATENT OFFICE.

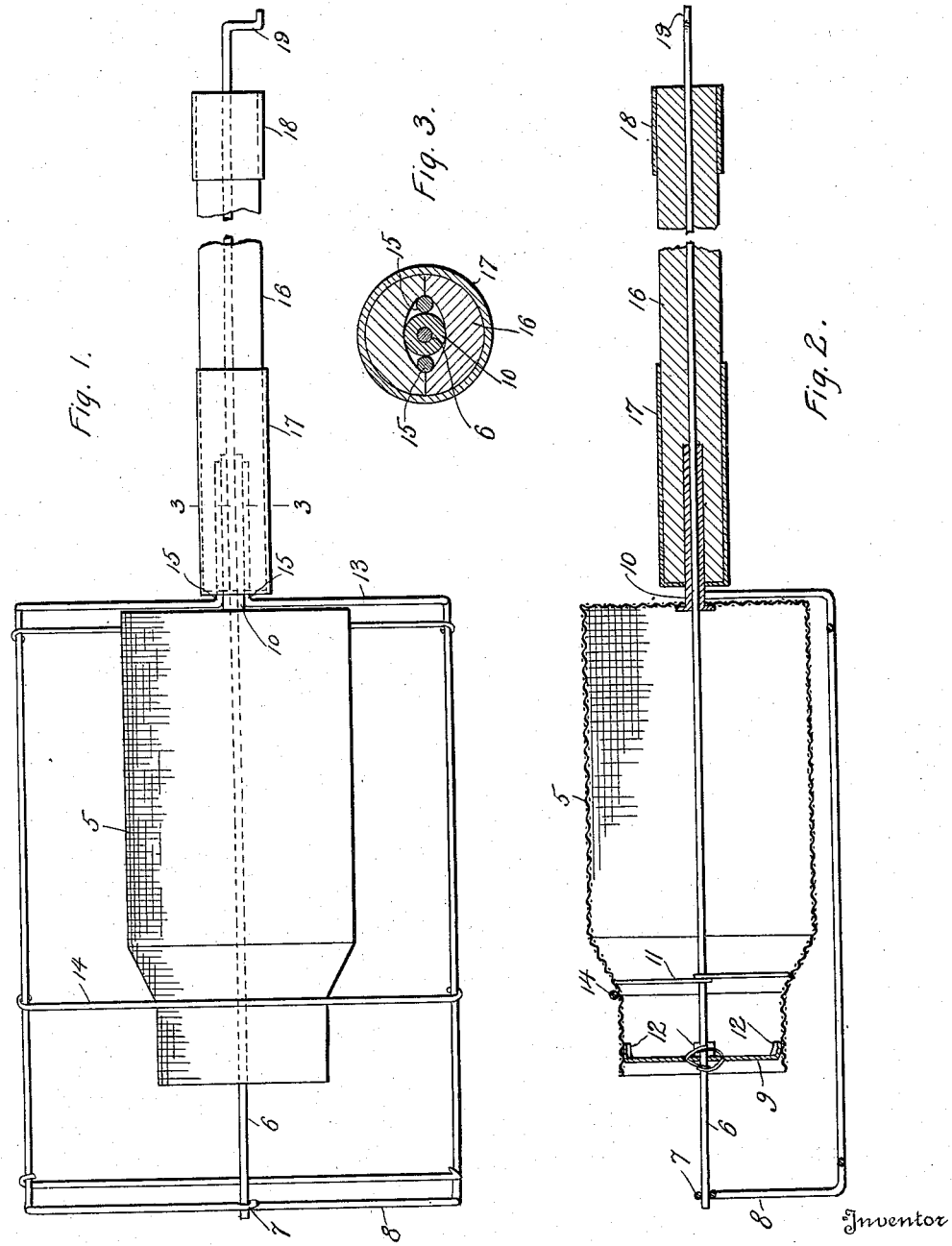

WILLIAM WILLIAMS, OF JASONVILLE, INDIANA.

CORN-POPPER.

1,160,231.   Specification of Letters Patent.   Patented Nov. 16, 1915.

Application filed October 29, 1914. Serial No. 869,186.

*To all whom it may concern:*

Be it known that I, WILLIAM WILLIAMS, a citizen of the United States, residing at Jasonville, in the county of Greene and State of Indiana, have invented certain new and useful Improvements in Corn-Poppers, of which the following is a specification.

This invention relates to apparatus for popping corn characterized by a rotary, open-work or screen cylinder, and the object of the invention is to provide a novel and improved apparatus of this kind which can be easily handled.

The herein stated object is attained by means of a combination and arrangement of parts to be hereinafter described and claimed, reference being had to the accompanying drawing, in which—

Figure 1 is a plan view of the apparatus; Fig. 2 is a central longitudinal section thereof, and Fig. 3 is an enlarged cross-section on the line 3—3 of Fig. 1.

Referring specifically to the drawing, 5 denotes an open-work, horizontal cylinder in which the corn to be popped is placed, and agitated by rotating the cylinder. The cylinder may be constructed of wire fabric or similar material. Extending axially through the cylinder is a rotary shaft 6 which is supported at its forward end in a suitable bearing 7 on a stand 8, the latter being constructed of wire, and open at the bottom so that the cylinder may be placed over the fire.

One end of the cylinder 5 is contracted and open, to permit the entry and discharge of the corn, and said open end is provided with a closure comprising a disk 9 which is fixed on the shaft 6, said shaft being slidable in the direction of its length, so that the disk may be inserted into, and removed from the open end of the cylinder. The closed end of the cylinder carries a sleeve 10 through which the shaft extends, and near the opposite open end of the cylinder, the latter contains a cross bar 11 having at the center a bearing for the shaft. The inner face of the disk 9 has inturned marginal flanges 12, which latter frictionally engage the inner surface of the contracted end of the cylinder when the disk is inserted thereinto, and thus couple the cylinder to the shaft, so that when the latter is rotated, the cylinder rotates therewith. The shaft is slidable in the bearing 7 and the sleeve 10, so that it may be moved lengthwise to insert the disk and to remove the same from the cylinder. Longitudinal movement of the cylinder is prevented by the rear cross bar 13 of the stand 8, and by a cross bar 14 carried by the side bars of the stand, and extending across the forward reduced end of the cylinder. The cross bar 13 is divided intermediate its ends, and the two ends 15 are bent outward parallel to the sleeve, and extend with the latter into a hollow handle 16. The shaft 6 also passes through the handle 16, and over the ends of the latter fit ferrules 17 and 18, respectively. The shaft projects a short distance from the outer end of the handle, and terminates in a crank handle 19, whereby it may be conveniently turned to rotate the cylinder 5. The handle is in two parts which are held together by the ferrules. The projecting ends 15 of the cross bar 13, and the sleeve 10 are clamped in the handle by the ferrule 17, whereby the handle is connected to the stand 8. The cylinder is loose on the sleeve and turns thereon, the sleeve being stationary by reason of its connection with the handle.

In operation, the device is held over the fire by grasping the handle 16 with one hand, leaving the other hand free to rotate the shaft 6 by means of the crank handle 19. To discharge the corn from the cylinder 5, it is necessary only to push the shaft forward, which takes the disk 9 out of the open end or mouth of the cylinder, and then by tilting the cylinder the corn is discharged therefrom. It will therefore be seen that the device can be easily operated, and as it is simple in construction it can be cheaply manufactured, and it has no complicated parts liable to get out of order.

I claim:

1. A corn popper comprising a stand having a bearing at one end and projecting parts at the opposite end, a cylinder, a sleeve extending from one end of the cylinder, on which sleeve the cylinder is free to rotate, a handle into which the sleeve and the aforesaid projecting parts extend and are fastened, a rotary shaft passing through the handle, the sleeve and the cylinder, and supported at its outer end in the aforesaid bearing, and means for coupling the shaft to the cylinder.

2. A corn popper comprising a stand having a bearing at one end and projecting parts at the opposite end, a cylinder, a sleeve extending from one end of the cylinder, on which sleeve the cylinder is free to rotate, a handle into which the sleeve and the aforesaid projecting parts extend and are fastened, a rotary shaft passing through the handle, the sleeve and the cylinder, and supported at its outer end in the aforesaid bearing, and a closure for the cylinder fixed on the shaft, said shaft being movable in the direction of its length to apply and remove the closure.

3. A corn popper comprising a stand having a bearing at one end and projecting parts at the opposite end, a cylinder, a sleeve extending from one end of the cylinder, on which sleeve the cylinder is free to rotate, a handle into which the sleeve and the aforesaid projecting parts extend and are fastened, a rotary shaft passing through the handle, the sleeve and the cylinder, and supported at its outer end in the aforesaid bearing, and a closure for the cylinder fixed on the shaft, said shaft being movable in the direction of its length to apply and remove the closure, said closure having means for coupling the shaft to the cylinder.

In testimony whereof I affix my signature in presence of two witnesses.

WILLIAM WILLIAMS.

Witnesses:
WILLIAM T. JAMES,
JOSEPHINE LUNDY.

Copies of this patent may be obtained for five cents each, by addressing the "Commissioner of Patents, Washington, D. C."